United States Patent
Kang et al.

(10) Patent No.: US 11,946,742 B2
(45) Date of Patent: Apr. 2, 2024

(54) ANGLE DETECTION OF HINGES IN ROLLABLE DEVICES

(71) Applicant: STMicroelectronics Asia Pacific Pte Ltd., Singapore (SG)

(72) Inventors: Tae-gil Kang, Seoul (KR); Sung Kyu Kim, Seoul (KR); Sa Hyang Hong, Seoul (KR); Chang Woo Lee, Hwasung-si (KR)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 86 days.

(21) Appl. No.: 17/374,560

(22) Filed: Jul. 13, 2021

(65) Prior Publication Data
US 2023/0013804 A1    Jan. 19, 2023

(51) Int. Cl.
| | |
|---|---|
| G06F 3/041 | (2006.01) |
| G01B 7/30 | (2006.01) |
| G01B 7/32 | (2006.01) |
| G06F 3/044 | (2006.01) |
| G09G 3/00 | (2006.01) |

(52) U.S. Cl.
CPC ............... *G01B 7/30* (2013.01); *G01B 7/32* (2013.01); *G06F 3/0446* (2019.05); *G09G 3/035* (2020.08); *G06F 2203/04102* (2013.01); *G09G 2340/0407* (2013.01); *G09G 2340/045* (2013.01); *G09G 2340/0464* (2013.01)

(58) Field of Classification Search
CPC .......... G01B 7/30; G01B 7/32; G06F 3/0446; G06F 2203/04102; G09G 3/035; G09G 2340/0407; G09G 2340/045; G09G 2340/0464
See application file for complete search history.

(56) References Cited

U.S. PATENT DOCUMENTS

| | | |
|---|---|---|
| 6,771,232 B2 | 8/2004 | Fujieda et al. |
| 7,639,237 B2 | 12/2009 | Perkins |
| 8,842,090 B1 | 9/2014 | Cho et al. |
| 8,922,531 B2 | 12/2014 | Lee |
| 8,928,635 B2 | 1/2015 | Harley et al. |
| 9,152,180 B2 | 10/2015 | Kim |
| 9,870,029 B2 | 1/2018 | Kim et al. |
| 9,911,369 B2 | 3/2018 | Kim et al. |
| 10,101,772 B2 | 10/2018 | Aurongzeb et al. |
| 10,146,257 B2 | 12/2018 | Alonso et al. |
| 10,168,821 B2 | 1/2019 | Chi et al. |
| 10,424,272 B2 | 9/2019 | Yoon et al. |
| 10,503,307 B2 | 12/2019 | Hong et al. |
| 10,937,393 B2 | 3/2021 | Lee et al. |
| 2010/0033435 A1 | 2/2010 | Huitema |

(Continued)

FOREIGN PATENT DOCUMENTS

CN    107402672    * 11/2017

*Primary Examiner* — Roy P Rabindranath
(74) *Attorney, Agent, or Firm* — Slater Matsil, LLP

(57) ABSTRACT

In an example, a display device includes a rollable display including a display side and an opposite non-display side. The rollable display includes a conductive material with a pattern disposed on the non-display side. The device includes a housing configured to house the rollable display and configured to roll in and roll out the rollable display along a first direction, and a capacitive sensor including a transmitter and a receiver electrode disposed within the housing and configured to sense the pattern.

20 Claims, 14 Drawing Sheets

(56) References Cited

U.S. PATENT DOCUMENTS

| | | | |
|---|---|---|---|
| 2012/0327027 A1* | 12/2012 | Chang | G06F 3/04166 345/174 |
| 2013/0127917 A1* | 5/2013 | Kwack | G06F 1/1652 345/660 |
| 2016/0011690 A1* | 1/2016 | Rowe | G06F 3/041662 345/174 |
| 2016/0034997 A1 | 2/2016 | Amacker | |
| 2017/0011714 A1* | 1/2017 | Eim | G06F 1/1677 |
| 2018/0374452 A1 | 12/2018 | Choi et al. | |
| 2020/0076940 A1 | 3/2020 | Kim et al. | |
| 2020/0341591 A1 | 10/2020 | You et al. | |
| 2022/0147180 A1* | 5/2022 | Lee | G06F 1/1652 |
| 2022/0335869 A1* | 10/2022 | Kwak | G06F 1/1624 |

\* cited by examiner

ANGLE DETECTION OF HINGES IN ROLLABLE DEVICES

TECHNICAL FIELD

The present invention relates generally to a system for angle detection, in particular embodiments, to a system for angle detection of hinges in rollable devices.

BACKGROUND

Many modern electronic devices such as mobile phones, tablets, and gaming systems include a touchscreen for displaying image information. Traditionally, touchscreens are not bendable, foldable, or rollable, and therefore, the size of the display dictates the overall size of the device. Accordingly, when a large display is adopted, the size of the electronic device increases.

With the development of flexible displays, in particular rollable displays, the size of a display may be increased without increasing the size of the device. As more electronic devices continue to have rollable displays, the manufacturing of such electronic devices demands improved technologies to design, manufacture, house, and control rollable displays.

SUMMARY

In accordance with an embodiment of the present invention, a display device includes a rollable display including a display side and an opposite non-display side, the rollable display including a conductive material with a pattern disposed on the non-display side. The display device includes a housing configured to house the rollable display and configured to roll in and roll out the rollable display along a first direction; and a capacitive sensor including a transmitter and a receiver electrode disposed within the housing and configured to sense the pattern.

In accordance with an embodiment of the present invention, a display device includes a rollable display including a display side and an opposite non-display side; a housing configured to house the rollable display and configured to roll in and roll out the rollable display along a direction; a touchscreen on a display side of the rollable display, the touchscreen including a capacitive sensor and a touchscreen controller. The capacitive sensor includes a plurality of lines of transmitter electrodes and a plurality of lines of receiver electrodes, the plurality of lines of transmitter electrodes being disposed perpendicular to the plurality of lines of receiver electrodes. The display device includes an additional electrode disposed within the housing, coupled to the touchscreen controller, and configured to interact with the capacitive sensor, where the touchscreen controller has a first program including instructions to: determine a location of the rollable display relative to the additional electrode by identifying which one of the plurality of lines of transmitter electrodes or the plurality of lines of receiver electrodes is nearest to the additional electrode, the location being indicative of a fractional amount of the rollable display outside the housing.

In accordance with an embodiment of the present invention, an exemplary method of displaying a media in a partially unrolled configuration of a rollable display includes: in response to sensing a motion of a rollable display from a first partially unrolled configuration to a second partially unrolled configuration, determining a number of rotations that occurred at a hinge of a housing for the rollable display using a capacitive sensor located at an opening of the housing during the motion of the rollable display; determining, using an angular sensor, an change in angle of a location of the hinge using the motion of the rollable display; and based on the number of rotations and the change in angle of the hinge, determine a fraction of the rollable display that is rolled out of the housing.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1A and 1B schematically illustrate a display device configured to roll a rollable display into, and unroll out of a housing having a back-side capacitive sensor in accordance with an embodiment, wherein FIG. 1A illustrates the display device with the rollable display entirely rolled in the housing, and FIG. 1B illustrates the display device with a portion of the rollable display unrolled out of the housing;

FIGS. 1E-1G schematically illustrate the back side of the display device with the rollable display at different positions relative to the housing, wherein FIG. 1E illustrates when the rollable display is entirely rolled in the housing, FIG. 1F illustrates when a portion of the rollable display is unrolled out of the housing, and FIG. 1G illustrates when the rollable display is entirely unrolled out of the housing;

FIGS. 2A and 2B schematically illustrate a display device configured to roll a rollable display into, and unroll out of a housing having a front-side capacitive sensor in accordance with an embodiment, wherein FIG. 2A illustrates the display device with the rollable display entirely rolled in the housing, and FIG. 2B illustrates the display device with a portion of the rollable display unrolled out of the housing;

FIGS. 2G-2J schematically illustrate the front-side capacitive sensor in various embodiments, wherein FIG. 2G illustrates the front-side capacitive sensor comprising two receiver electrodes, FIG. 2H illustrates the front-side capacitive sensor comprising two receiver electrodes and two grounded materials, FIG. 2I illustrates the front-side capacitive sensor comprising two transmitter electrodes, and FIG. 2J illustrates the front-side capacitive sensor comprising two transmitter electrodes and two grounded materials;

FIGS. 3B-3H schematically illustrate a back-side capacitive sensor and a back side of a rollable display having a pattern of a conductive material in accordance with various embodiments, wherein FIG. 3B illustrates the back-side capacitive sensor comprising two receiver electrodes and a transmitter electrode, FIG. 3C illustrates the pattern of the back side of the rollable display in accordance with an embodiment, FIG. 3D illustrates the pattern of the back side of the rollable display in accordance with another embodiment, FIG. 3E illustrates the back-side capacitive sensor comprising three receiver electrodes and a transmitter electrode, FIG. 3F illustrates the pattern of the back side of the rollable display in accordance with an alternate embodiment, FIG. 3G illustrates the back-side capacitive sensor comprising a receiver electrodes and a transmitter electrode, and FIG. 3H illustrates the pattern of the back side of the rollable display in accordance with a different embodiment;

FIGS. 4A and 4B schematically illustrate a hinge of a display device equipped with an angular sensor configured to determine an angle of the hinge, wherein FIG. 4A illustrates the display device containing the hinge, and FIG. 4B illustrates a pin and hinge plates of the hinge equipped with the angular sensor;

DETAILED DESCRIPTION OF ILLUSTRATIVE EMBODIMENTS

This application relates to a display device, more particularly to estimating an unrolled fraction of a rollable display. Flexible displays such as rollable displays are widely applied in various electronic devices with a touchscreen such as mobile phones, tablets, and gaming systems. In these applications, a display can be contained in a housing when not used, thereby saving space. It is also possible to display a scaled media only on the unrolled area of the display out of the housing. However, a conventional use of motors to roll and unroll the display may be slow, power hungry, and less user friendly. Therefore, a display device that does not require a motor and yet is capable of economically estimating the unrolled area of the display may be desired. Embodiments of the present application disclose devices and methods of estimating the unrolled area by calculating an unrolled fraction of a rollable display based on determination of a total rotated angle for the display.

The devices and methods described in this disclosure may advantageously eliminate the need for a motor for roll/unroll the display. A user thus can adjust the display area size manually. Removing a motor may also lower the cost of the device. Further, the embodiment device may take advantages of existing elements, for example, in a touchscreen controller or a magnetic hinge, thereby requiring only minimal additional components and processing time for a better user experience.

In the following, two approaches based on capacitive sensing for estimating an unrolled area of a display are described. First, referring to FIGS. 1A-1N, a capacitive sensing with a back-side capacitive sensor configured to sense a pattern comprising a conductive material on the back side of the display is described in accordance with various embodiments. Next, referring to FIGS. 2A-2K, another capacitive sensing with a front-side capacitive sensor configured to couple, e.g., capacitively, with electrodes in a touchscreen on the front side of the display is described in accordance with alternate embodiments. Further, as a third approach, one of these capacitive sensing methods or both may be combined with angular sensing, as described in FIGS. 3A-3G and FIGS. 4A-4C. In FIG. 5, a flow diagram for this capacitive-angular combined method is illustrated.

Figure 1A:
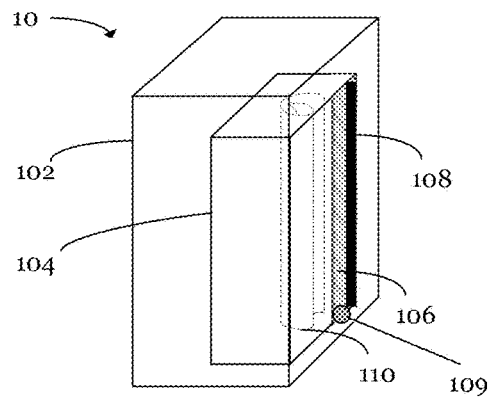
Figure 1B:
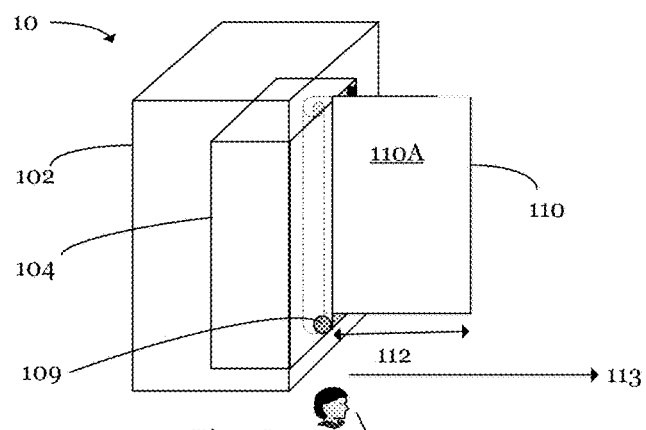

FIGS. 1A and 1B schematically illustrate a display device 10 configured to roll and unroll a rollable display no, having a back-side capacitive sensor 108 in accordance with an embodiment.

Illustrated in FIG. 1A, the display device 10 comprises a retainment structure 104 in a housing 102. In various embodiments, the display device 10 may be a mobile phone, tablets, hand-held gaming units, and other electronic devices. The rollable display no is entirely contained in the retainment structure 104. In one or more embodiments, the housing 102 may further comprise auxiliary components (e.g., speakers, microphones, switches, etc.) that have been assembled into the housing 102 to provide various functionalities to the display device 10. The retainment structure 104 may further include an opening 106 from which the rollable display no can extend out for use. The retainment structure 104 includes the back-side capacitive sensor 108 near the back side of the opening 106. The rollable display no may comprise a light emitting diode (LED) flexible display, organic LED display, or any other type of flexible display.

FIG. 1B illustrates the display device 10 with a portion of the rollable display no unrolled out of the housing 102 in a rolling direction 113.

The rolling direction 113 in FIG. 1B is to the right from a viewpoint of a user 115. In the disclosure, front sides and back sides of various elements of the display device 10 are also referenced based on the viewpoint of the user 115. Accordingly, a front side 110A of the rollable display no is visible by the user 115. This configuration allows a landscape mode of operation. Although not specifically illustrated, the rolling direction 113 may be in any direction (e.g., to the left from the viewpoint of the user 115) with appropriate configuration of the elements of the display device 10 (e.g., the opening 106). For example, the rollable display no may be oriented to allow a portrait mode of operation with the rolling direction 113 in a vertical direction.

The rollable display no may be rolled or unrolled to any unrolled position between the fully rolled position (e.g., FIG. 1A) and the fully unrolled position. For example, the rollable display no can be unrolled from the fully rolled position (e.g., FIG. 1A) to the fully unrolled position, from the fully rolled position (e.g., FIG. 1A) to a partially unrolled position (e.g., FIG. 1B), from any partially unrolled position to another partially unrolled position, from any partially unrolled position to a fully unrolled position, or any other combination thereof.

In FIG. 1B, an unrolled portion of the rollable display no may be indicated by a fractional length 112 of the unrolled portion of the rollable display 110, taking a value between 0 and 1. The fractional length 112 is a length of the unrolled portion of the rollable display 110 divided by the total length of the rollable display 110. In various embodiments, an image/video may be projected to the unrolled portion of the rollable display 110.

The fractional length 112 may be determined and used to calculate the unrolled area of the rollable display no according to an embodiment method described below using the back-side capacitive sensor 108.

In one or more embodiments, although not specifically illustrated, the far end of the rollable display no may be mounted in a second retainment structure within a second housing. Further, the rollable display no may be configured to rolled or unrolled into the first retainment structure and the second retainment structure simultaneously in a scroll like fashion. For example, the user may extend the first housing and the second housing in opposite directions to enlarge the rollable display 110.

In certain embodiments, the back-side capacitive sensor 108 may be configured to be activated/powered in response to sensing a motion of the rollable display 110. The display device 10 may comprise an optional motion sensor 109 as illustrated in FIGS. 1A, 1B and 1N. The motion sensor 109 can allow the back-side capacitive sensor 108 to be off when there is no motion of the rollable display 110.

Figure 1C:
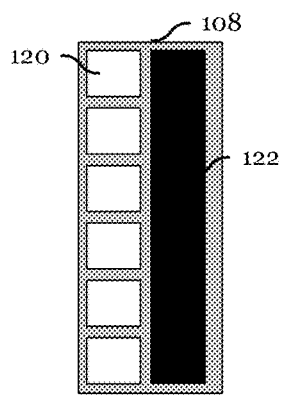
FIG. 1C schematically illustrates the back-side capacitive sensor comprising six receiver electrodes and a transmitter electrode configured to sensor a pattern on the back side of the rollable display in accordance with an embodiment.
Figure 1D:
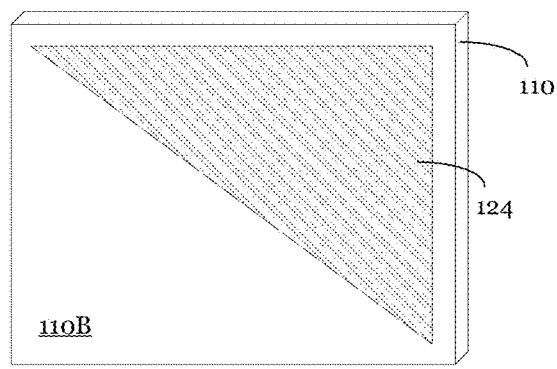
FIG. 1D schematically illustrates the back side of a rollable display having the pattern comprising a conductive material.

FIG. 1C schematically illustrates the back-side capacitive sensor 108 comprising six receiver electrodes 120 and a transmitter electrode 122 configured to sensor a pattern on the back side of the rollable display no in accordance with an embodiment. FIG. 1D schematically illustrates a back side 110B of the rollable display no having a pattern 124 comprising a conductive material.

The conductive material may comprise copper, aluminum, silver, or any other suitable conductive materials to be formed on the back side 110B of the rollable display 110. In certain embodiments, the conductive material may be coupled to a grounding electrode. In other embodiments, the conductive material may be electrically floated.

The fractional length 112 illustrated in FIG. 1B may be determined using the back-side capacitive sensor 108 configured to sense the pattern 124. The back-side capacitive sensor 108 may be used as a transmitter electrode and a receiver electrode, coupled to a controller, and is able to detect a change in capacitance in the vicinity of the electrodes. When a conductive material is in the vicinity of the electrodes, similar to a case of touch sensing, an electric field is affected by the conductive material and the capacitance of a capacitive sensor is reduced relative to when the conductive material is absent (e.g., when the display is fully extended). The reduction in the capacitance thereby indicates the presence of the conductive material. In various embodiments, the pattern 124 may be selected to have a detectable change of pattern across the rollable display no in the rolling direction 113. Therefore, the amount of reduction in the capacitance may be used to compute the amount of extension of the display.

Sensing may be performed either by mutual sensing or self sensing. A mutual sensing process measures a change in capacitance between two electrodes (e.g., a transmitter electrode and a receiver electrode). Self sensing measures a change in a capacitance between an electrode and a reference such as ground.

When the rollable display no is rolled out of the housing 102, a position of the rollable display no changes relative to the housing 102. As the position of the back-side capacitive sensor 108 is fixed to the housing 102, as the rollable display no moves, different regions of the rollable display 110 passes through the vicinity of the back-side capacitive sensor 108, enabling the capacitive sensing method according to the embodiment.

Thus the area of the rollable display no that can be used for displaying content or media can be determined. The media may then be scaled based on the resolution of the display as determined from the area. The scaled media may be transmitted to the rollable display no to be rendered.

Figure 1E:
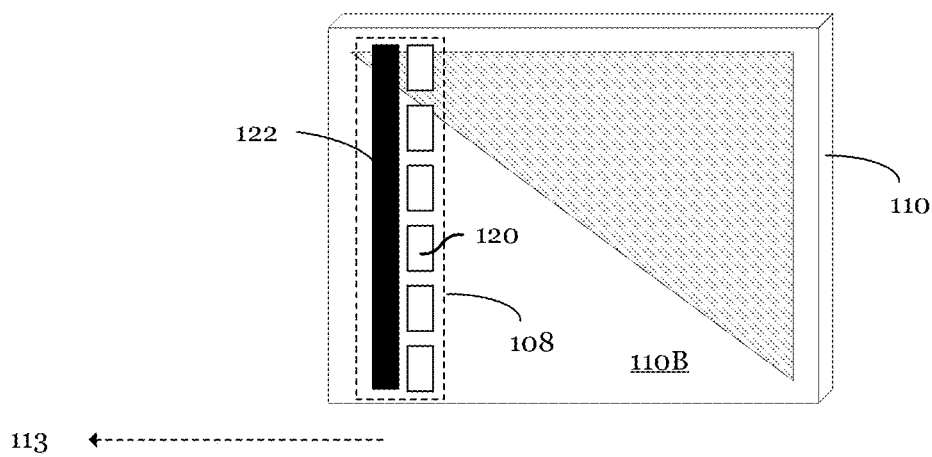
Figure 1F:
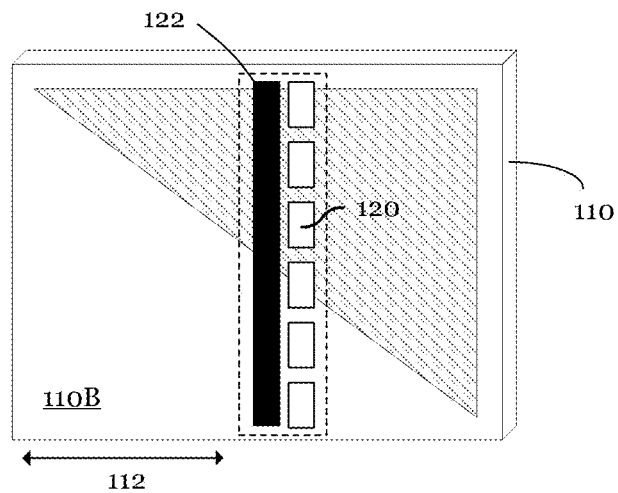
Figure 1G:
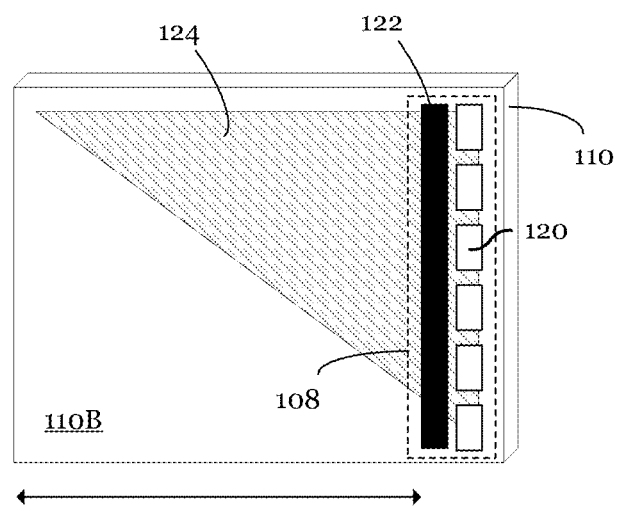

FIGS. 1E-1G schematically illustrate the back side 110B of the rollable display no at different positions relative to the housing 102 and also the back-side capacitive sensor 108 positioned in the housing 102. A process of determining the fractional length 112 will be described using FIGS. 1E-1G. FIG. 1E illustrates when the rollable display no is entirely rolled in the housing 102 (i.e., the fractional length 112 is 0), FIG. 1F illustrates when a portion of the rollable display no is unrolled out of the housing 102 (i.e., the fractional length 112 is between 0 and 1), and FIG. 1G illustrates when the rollable display no is entirely unrolled out of the housing 102 (i.e., the fractional length 112 is 1).

In these example embodiments, the back-side capacitive sensor 108 is a same configuration as illustrated in FIG. 1C, and the pattern 124 has a same triangular shape as illustrated in FIG. 1D. It should be noted that FIG. 1D and FIGS. 1E-1G are views from the back side of the display device 10, in contrast to FIGS. 1A-1C, and therefore the back-side capacitive sensor 108 is also illustrated from the back side. Accordingly, the rolling direction 113 appears to point to the left in FIGS. 1E-1G.

In FIG. 1E, all of the rollable display no is within the housing 102 and the fractional length 112 is 0. The rollable display no should be entirely rolled but is depicted as flat for illustration purpose. Among the six receiver electrodes 120, only the top two receiver electrodes are in the vicinity of the conductive material of the pattern 124. Therefore, the capacitance signal intensity relative to a baseline, for example, may be determined as, from the top receiver electrode to the bottom, (0%, 10%, 100%, 100%, 100%, 100%).

In FIG. 1F, the portion of the rollable display no is unrolled out of the housing 102 (i.e., the fractional length 112 is between 0 and 1). The top four receiver electrodes are in the vicinity of the conductive material of the pattern 124. Therefore, the capacitance signal intensity relative to a baseline, for example, may be determined as, form the top receiver electrode to the bottom, (0%, 0%, 0%, 50%, 100%, 100%).

In FIG. 1G, all of the rollable display no is unrolled out of the housing 102 (i.e., the fractional length 112 is 1). All of the six receiver electrodes 120 are in the vicinity of the conductive material of the pattern 124. Therefore, the capacitance signal intensity relative to a baseline, for example, may be determined as, form the top receiver electrode to the bottom, (0%, 0%, 0%, 0%, 0%, 10%).

In various embodiments, the number of electrodes in the back-side capacitive sensor 108 is not specifically limited. In certain embodiments, the back-side capacitive sensor 108 may comprise more than six receiver electrodes. Increasing the number of electrodes may advantageously provide better resolution in determining the fractional length 112. In other embodiments, the back-side capacitive sensor 108 may comprise less than 6 receiver electrodes. Less electrodes may save cost and simplify the device design. In yet other embodiments, the back-side capacitive sensor 108 may comprise more than one transmitter electrodes. In one embodiment, the back-side capacitive sensor 108 may comprise one receiver electrode and six transmitter electrodes. Each of the six transmitter electrodes may have a different driving time in a mutual sensing mode. In other words, six nodes of measurements may be performed at different times with each of the six transmitter electrodes driven independent of each other. This embodiment method may require higher power consumption to drive multiple transmitter electrodes. On the other hand, in an embodiment with one transmitter electrode, one or more nodes may only be measured at the same time but the power consumption may be lower. A trade-off between resolution (monitoring performance) and cost may be considered to select an appropriate design for different applications. A controller having more receiver electrodes may be more expensive because it needs more analog-to-digital converters (ADC) inside of the device. However, such a design can scan capacitance at the same time even when the rollable display no is being rolled or unrolled.

Further, although not specifically illustrated, the electrodes of the back-side capacitive sensor 108 may be arranged differently. In certain embodiments, the height of the back-side capacitive sensor 108 may be substantially shorter than the height of the rollable display 110.

In some embodiments, the back-side capacitive sensor 108 may further comprise a region coupled to a reference potential such as ground.

In various embodiments, the pattern 124 on the back side 110B of the rollable display no may take various shapes. FIGS. 1H-1M schematically illustrate examples of the back side of the rollable display no having different patterns comprising the conductive material.

Figure 1H:
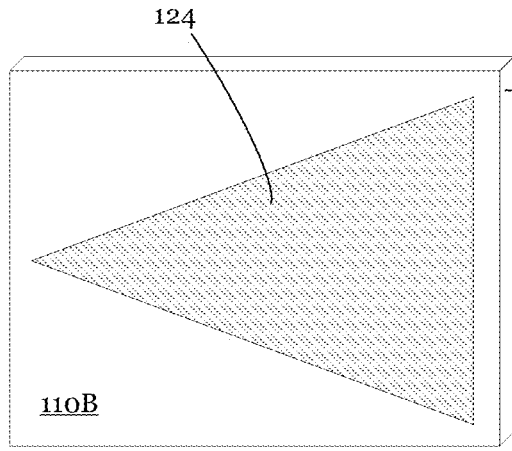
FIGS. 1H-1M schematically illustrate the back side of the rollable display having different patterns comprising the conductive material.
Figure 1I:
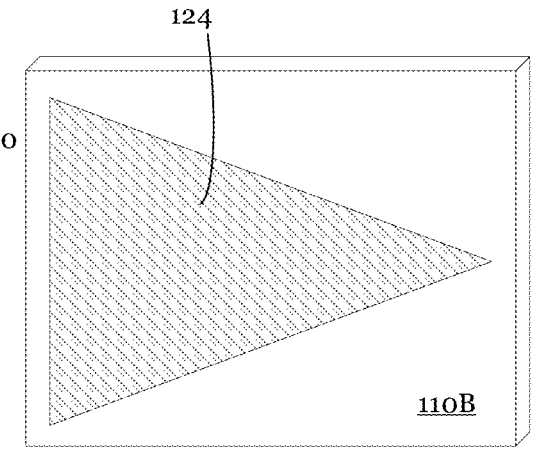
Figure 1J:
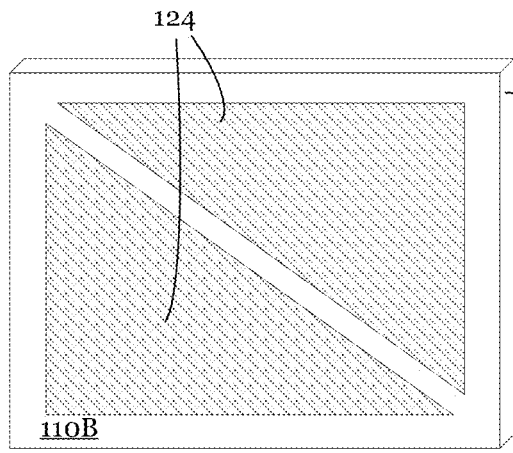
Figure 1K:
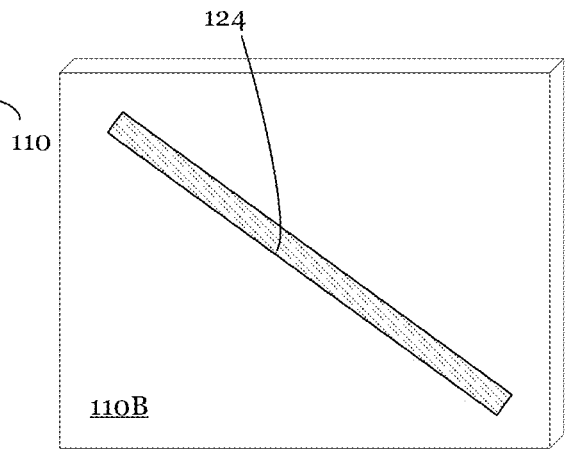
Figure 1L:
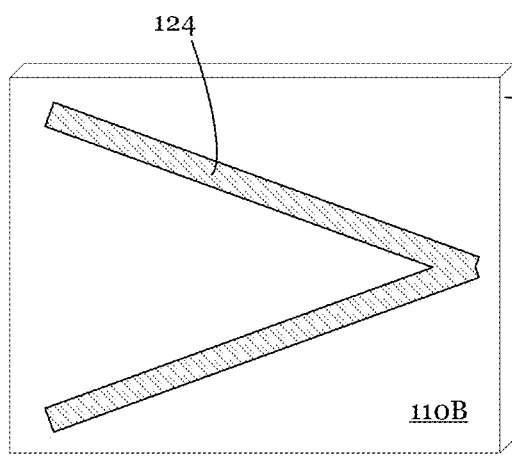
Figure 1M:
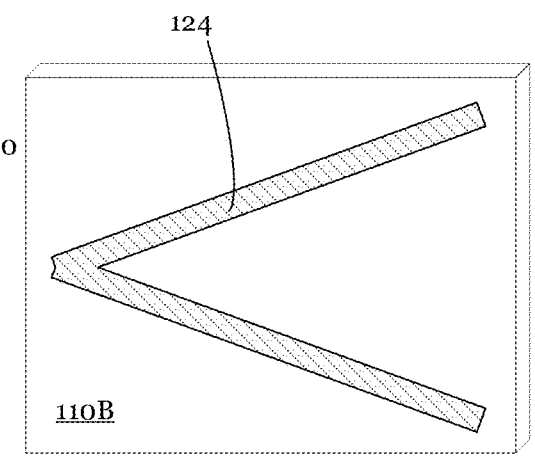
Figure 1N:
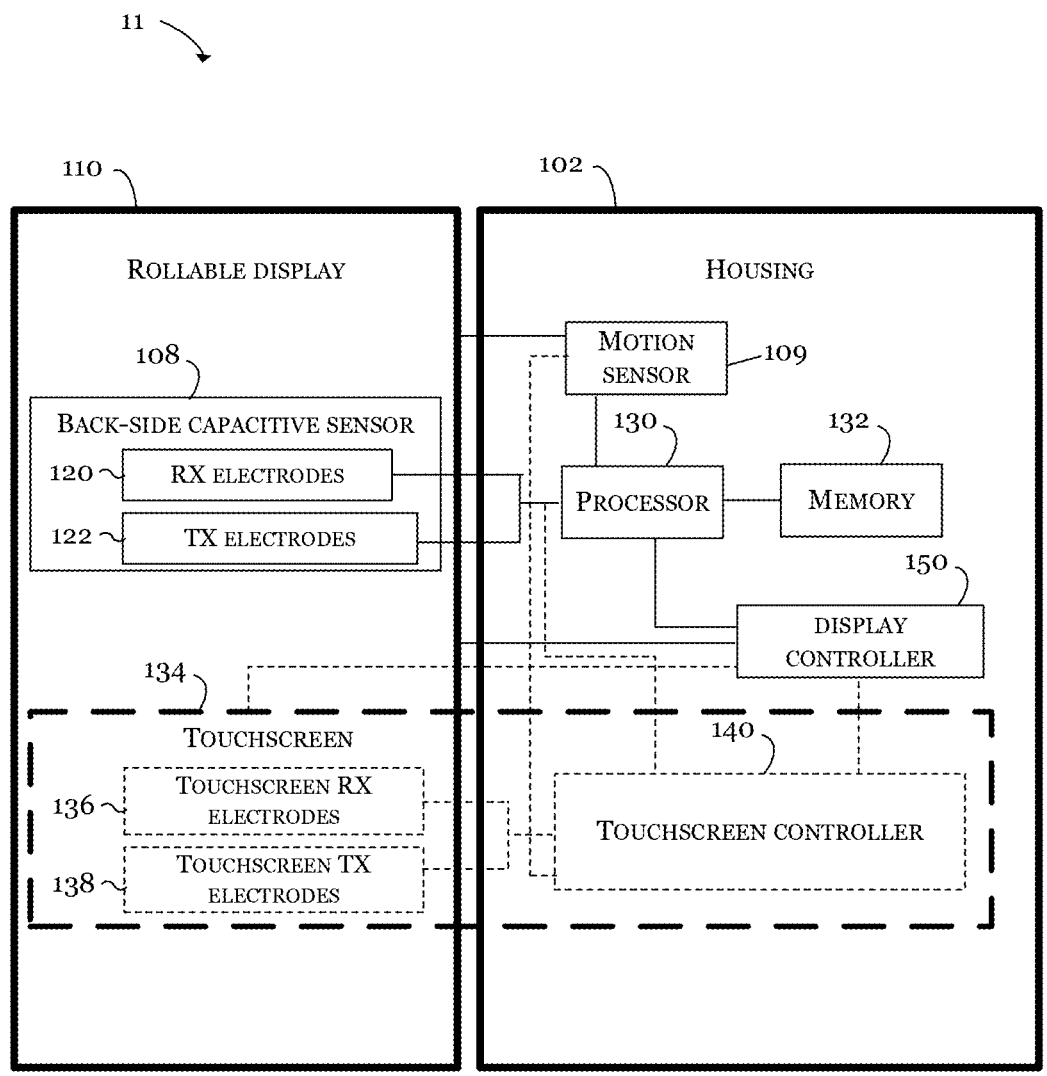
FIG. 1N schematically illustrates a system diagram of the display device having the back-side capacitive sensor.

A pattern 124 that is uniquely indicative of a position of the rollable display 110 relative to the housing 102 may be used. FIG. 1H illustrates the pattern 124 of an isosceles triangle facing to the left, FIG. 1I illustrates the pattern 124 of an isosceles triangle facing to the right, and FIG. 1J illustrates the pattern 124 of two rectangular triangles with a diagonal gap line between the rectangular triangles. These simple designs of the pattern 124 may be easy to manufacture. In other examples, FIG. 1K illustrates the pattern 124 of a diagonal line, FIG. 1L illustrates the pattern 124 of a greater-than sign made of two diagonal lines, and FIG. 1M illustrates the pattern 124 of a less-than sign made of two diagonal lines. These designs of the patterns 124 may advantageously require less material to manufacture and thereby desirable for cost reduction. Adding more complex designs may be advantageous to improve accuracy but may increase manufacturing costs, processing complexity, and/or power usage.

FIG. 1N schematically illustrates a system diagram of a display device 11 having the back-side capacitive sensor 108 in accordance with one embodiment.

As illustrated in FIG. 1N, in various embodiments, the display device 11 includes a rollable display no and a housing 102 to house the rollable display 110 in a rolled configuration. The housing 102 may be any suitable design that enables the rolling and unrolling of the rollable display 110. A hinge based system is discussed herein in various embodiments for illustration purposes. The rollable display no includes a touchscreen 134, which may be optional. For example, devices such as tablets or smartphone may include a touchscreen 134 while larger displays such as televisions may not have a touch screen. As embodiments of the disclosure may be implemented in either designs, both implementations are schematically shown in FIG. 1N. However, the design with the optional touchscreen 134 is shown within dashed lines.

In various embodiments, the rollable display no includes a back-side capacitive sensor 108 located on the back-side (or non-display side) of the rollable display 110. The back-side capacitive sensor 108 may include one or more receiver (RX) electrodes 120 and one or more transmitter (TX) electrodes 122. The RX and TX electrodes 120 and 122 may be coupled to a processor 130 (through intermediary front-end circuits, for example, through an analog-to-digital converter (ADC), to convert the analog signals to digital signals).

The processor 130 may be a main processor controlling all aspects of the display device 11, for example. The housing 102 may also include a memory 132 coupled to the processor 130. The memory 132 may include a non-volatile memory. A program comprising instructions may be stored in the memory 132.

The program may include instructions for driving the back-side capacitive sensor 108 as well as for sensing the data obtained from the back-side capacitive sensor 108. For example, the processor 130 may provide a command signal that, when provided to the back-side capacitive sensor 108 through an appropriate drive circuit, initiates the back-side capacitive sensor 108 to start sensing by providing a signal to the TX electrodes 122. Further, the processor 130 may receive the signals sensed through the RX electrodes 120, after A/D conversion, and may determine a change in capacitance based on the received signals. The processor 130 may then store the sensed data along with changes in capacitances in the memory 132. The processor 130 may also send command signals to a display controller 150 providing an area of the rollable display no in which data is to be rendered. This information may include a resolution for the data to be displayed. In addition, the processor may downscale or upscale the data based on the resolution of the rollable display no at which data is to be rendered. The processor 130 may also provide the upscaled/downscaled data to the rollable display 110. In some embodiments, the upscaling/downscaling may be performed at a different processor, for example, a dedicated graphics processor.

Alternately, the back-side capacitive sensor 108 may be coupled to the display controller iso, which may be configured to execute the instructions to be executed in the processor 130 as discussed above and calculate the area of the rollable display no in which data is to be rendered.

The display controller 150 may then transmits the data to be rendered to the rollable display 110.

In alternate embodiments, a touchscreen 134 may include a touchscreen RX electrodes 136 and touchscreen TX electrodes 138. The touchscreen RX electrodes 136 and touchscreen TX electrodes 138 may be driven with a touchscreen controller 140, which may be located either on the rollable display no or within the housing 102. The touchscreen RX electrodes 136 and touchscreen TX electrodes 138 may be similar to the descriptions detailed in FIGS. 2A-2K. In alternate embodiments, the touchscreen controller 140 may also perform the driving and sensing of the back-side capacitive sensor 108 instead of the processor 130. In some embodiments, the display controller 150 and the touchscreen controller 140 may be integrated in a single chip.

As discussed above, the display device 11 may further comprise analog front-end circuits (AFE) and analog-to-digital converters (ADC) between receiving electrodes (e.g., the RX electrodes 120 and the touchscreen RX electrodes 136) and the processor 130, display controller 150, or the touchscreen controller 140. In certain embodiments, AFE and ADC may be included in the processor 130, for example, when the processor 130 is an application specific IC (ASIC) or certain microcontrollers.

Accordingly, in various embodiments, the data sent from the back-side capacitive sensor 108 may be processed by the processor 130, display controller 150, or the touchscreen controller 140. In certain embodiments, the touchscreen controller 140 may simultaneously be detecting touch on the touchscreen 134. Further, the processing as per the embodiment method is less complex than conventional methods. In contrast to methods that use only capacitive sensing of the touchscreen 134, the display device 11 does not need to perform additional calculations to remove other touch actions.

In alternate embodiments, a front-side capacitive sensor instead of, or together with the back-side capacitive sensor 108, may be used as a means of detecting the fractional length 112 referring to FIGS. 2A-2K.

Figure 2A:
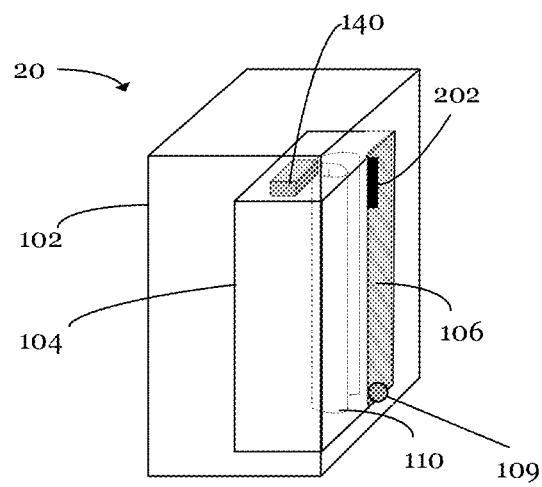
Figure 2B:
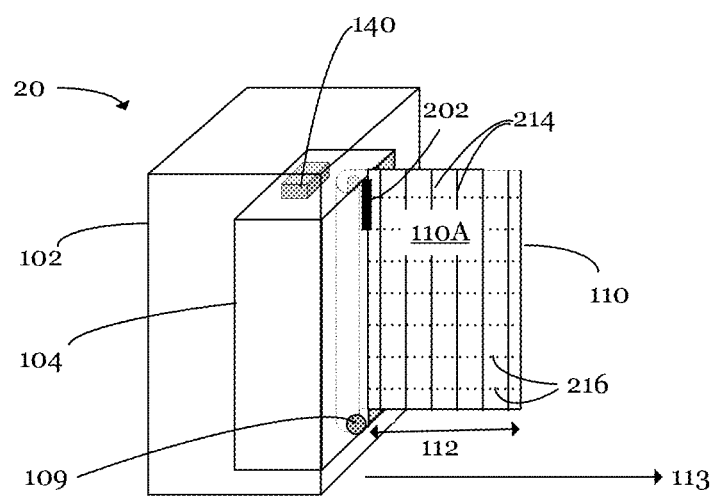

FIGS. 2A and 2B schematically illustrate a display device 20 configured to roll a rollable display into, and unroll out of a housing 102 having a front-side capacitive sensor 202.

Illustrated in FIG. 2A, similar to FIG. 1A, a rollable display no is entirely rolled in the housing 102. In various embodiments, a retainment structure 104 includes the front-side capacitive sensor 202 near the front side of an opening 106.

FIG. 2B, similar to FIG. 1B, illustrates the display device 20 with a portion of the rollable display no unrolled out of the housing 102 in a rolling direction 113, the portion being indicated by a fractional length 112.

In FIG. 2B, a front side 110A of the rollable device may comprise a touchscreen. The touchscreen may comprise an array of capacitive electrodes forming a grid comprising, for example, vertical lines of electrodes 214 (i.e., columns) and horizontal lines of electrodes 216 (i.e., rows), coupled to a touchscreen controller 140. As described more in detail below, in one embodiment illustrated in FIG. 2D, the vertical lines of electrodes 214 may be transmitter electrodes (e.g., the touchscreen transmitter electrodes 138 in FIG. 1N) and the horizontal lines of electrodes 216 may be receiver electrodes (e.g., the touchscreen receiver electrodes 136 in FIG. 1N). In another embodiment illustrated in FIG. 2F, the vertical lines of electrodes 214 may be receiver electrodes (e.g., the touchscreen receiver electrodes 136 in FIG. 1N) and the horizontal lines of electrodes 216 may be transmitter electrodes (e.g., the touchscreen transmitter electrodes 138 in FIG. 1N). Although not specifically illustrated, lines of electrodes in the touchscreen may be arranged in any direction with any angle.

The touchscreen controller 140 may be contained in the retainment structure 104. A touch by a user may induce a change in an electrical field, and thereby a capacitance in the vicinity of the location of the touch, and the electrodes nearby on the touchscreen may detect the change in capacitance and identify the location of the touch. Similarly, the front-side capacitive sensor 202, may be configured to couple, e.g., capacitively, with the electrodes on the touchscreen to determine a location of the rollable display no relative to the housing 102 (i.e., determine the fractional length 112). Similar to the prior embodiment, mutual sensing or self sensing may be performed.

In various embodiments, a transmitter-receiver pair of electrodes may be applied between the front-side capacitive sensor 202 and the vertical lines of electrodes 214 (in a direction normal to the rolling direction 113) to enable capacitive sensing for determining the fractional length 112 in the rolling direction 113. Therefore, a type of electrode for the front-side capacitive sensor 202 may be selected based on the type of electrode of the vertical lines of electrode 214.

The front-side capacitive sensor 202 is configured to detect a change in capacitance between the front-side capacitive sensor 202 and the vertical lines of electrodes 214. Specifically, the front-side capacitive sensor 202 may first identify which one of the vertical lines of electrodes 214 is nearest to the front-side capacitive sensor 202. Based on this information, a location of the front-side capacitive sensor 202 relative to the rollable display no in the rolling direction 113 may be determined.

In certain embodiments, similar to the prior embodiment, the front-side capacitive sensor 202 may be configured to be activated/powered in response to sensing a motion of the rollable display 110. The display device 20 may comprise an optional motion sensor 109 as illustrated in FIGS. 2A and 2B.

Figure 2C:
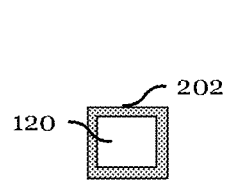
FIG. 2C schematically illustrates the front-side capacitive sensor comprising a receiver electrode configured to couple with lines of transmitter electrodes on the front side of the rollable display in accordance with an embodiment.
Figure 2D:
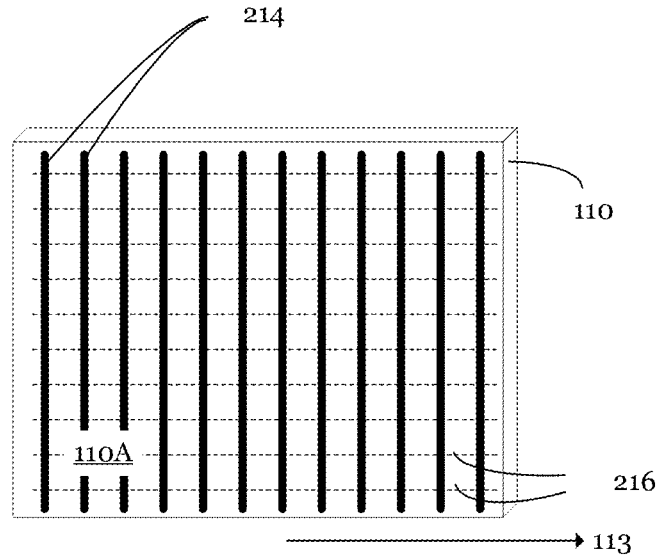
FIG. 2D schematically illustrates the front side of the rollable display having the lines of transmitter electrodes normal to a rolling direction and lines of receiver electrodes parallel to the rolling direction in accordance with the embodiment illustrated in FIG. 2C.

In one embodiment, illustrated in FIGS. 2C and 2D, the front-side capacitive sensor 202 may be used as the receiver electrode 120 (FIG. 2C), which may be configured to capacitively couple with the vertical lines of electrodes 214 being driven as transmitter electrodes (FIG. 2D) on the front side 110A of the rollable display 110. The receiver electrode 120 of the front-side capacitive sensor 202 is coupled to the touchscreen controller 140 (e.g., FIGS. 2A and 2B) and recognized as an additional electrode to the array of electrodes for touch sensing.

Figure 2E:
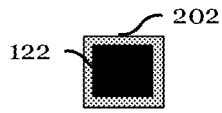
FIG. 2E schematically illustrates the front-side capacitive sensor comprising a transmitter electrode configured to couple with the lines of receiver electrodes on the front side of the rollable display in accordance with an embodiment.
Figure 2F:
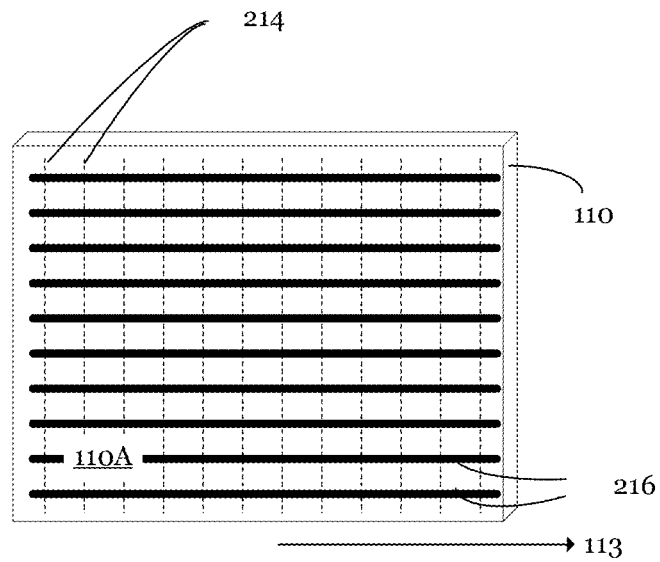
FIG. 2F schematically illustrates the front side of the rollable display having the lines of receiver electrodes normal to the rolling direction and the lines of transmitter electrodes parallel to the rolling direction in accordance with the embodiment illustrated in FIG. 2E.
Figure 2G:
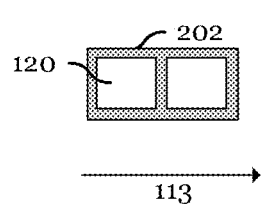
Figure 2H:
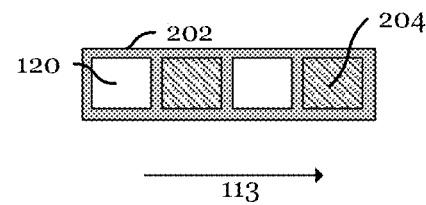
Figure 2I:
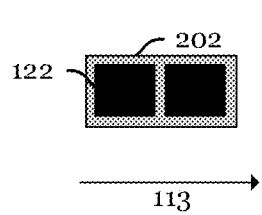
Figure 2J:
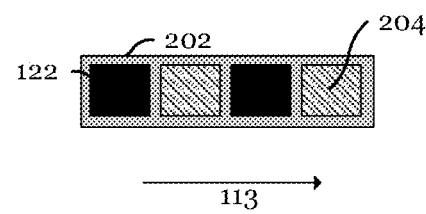

In another embodiment, illustrated in FIGS. 2E and 2F, the front-side capacitive sensor 202 may be driven as the transmitter electrode 122 (FIG. 2E) configured to couple, e.g., capacitively, with the vertical lines of electrodes 214 being used as receiver electrodes (FIG. 2F) on the front side 110A of the rollable display 110

The numbers of electrodes in the vertical lines and the horizontal lines are not specifically limited, and FIGS. are for illustration purpose only. For example, the touchscreen may have 26 receiver electrodes in the vertical lines (e.g., FIG. 2D) and the front-side capacitive sensor 202 may provide an additional, 27th receiver electrode.

FIGS. 2G-2J schematically illustrate the front-side capacitive sensor 202 with different arrangements of electrodes in accordance with various embodiments.

In various embodiments, more than one electrode may be used in the front-side capacitive sensor 202. Increasing the number of electrodes in the front-side capacitive sensor 202 may advantageously improve the accuracy of determining the location of the rollable display 110. For example, the front-side capacitive sensor 202 may comprise two receiver electrodes (FIG. 2G) or transmitter electrodes (FIG. 2I) disposed in the rolling direction 113. In certain embodiments, the front-side capacitive sensor 202 may further comprise reference electrodes 204 (e.g., FIGS. 2H and 2J). The reference electrodes 204 may be coupled to a fixed potential such as ground. Adding the reference electrodes 204 may advantageously help avoid saturation of capacitance due to close distances between receiver electrodes 120/transmitter electrode 122. The reference electrodes 204 may comprise, for example, two reference electrodes 204 and two receiver electrodes 120 (FIG. 2H) or two reference electrodes 204 and two transmitter electrodes 122 (FIG. 2I) may be alternately disposed in the rolling direction 113. Further, more than two electrodes and/or more than two reference electrodes 204 may be used.

Figure 2K:
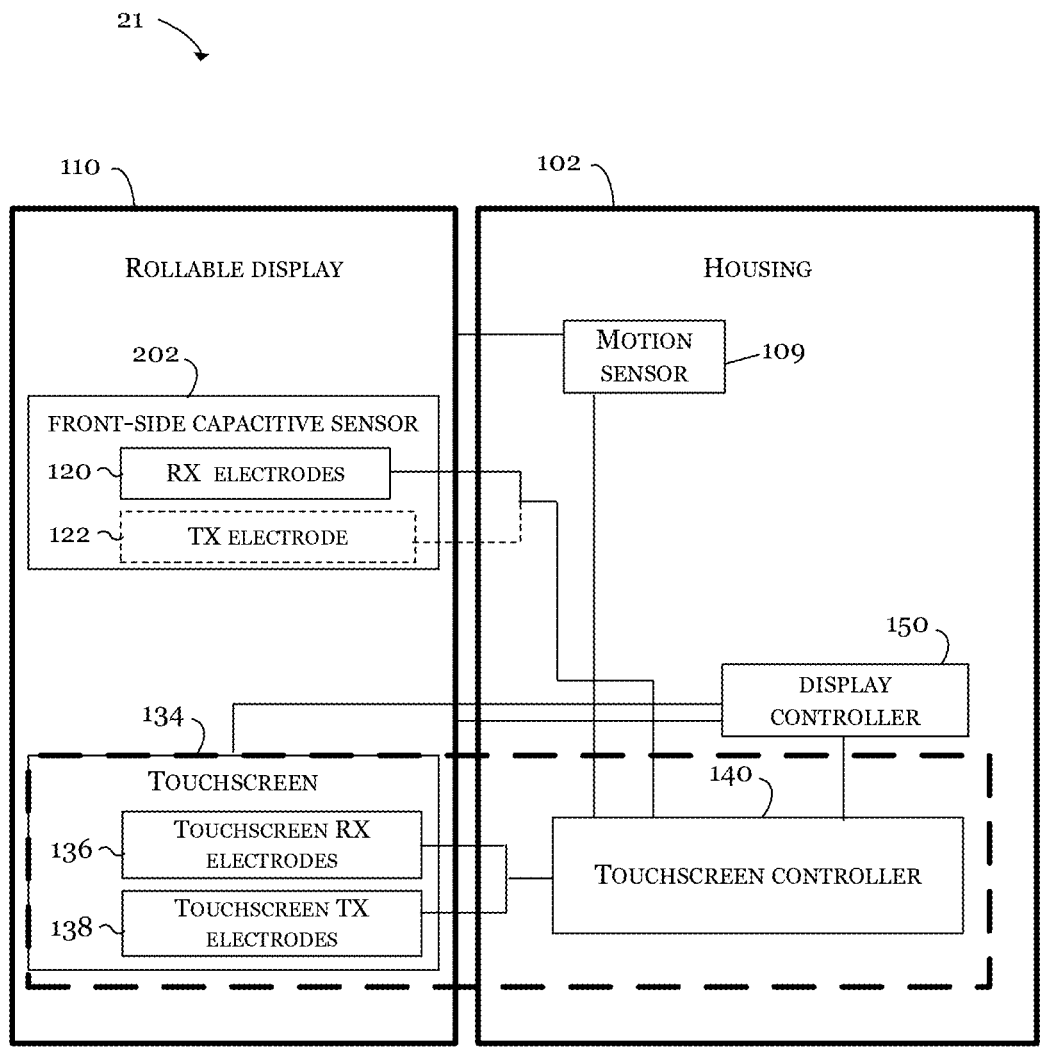
FIG. 2K schematically illustrates a system diagram of the display device having the front-side capacitive sensor.

FIG. 2K schematically illustrates a system diagram of a display device 21 having the front-side capacitive sensor 202 in accordance with one embodiment.

As already described above, the front-side capacitive sensor 202 may be used as the receiving (RX) electrode 120, or the transmitter (TX) electrode 122 indicated by a dotted line. In various embodiments, the front-side capacitive sensor 202 may be coupled to the touchscreen controller 140 to enable capacitive sensing. The touchscreen controller 140 performs tasks such as to drive the electrodes of the front-side capacitive sensor 202, measure a capacitance to determine a change in capacitance, stores a set of data, and communicate with the display controller 150. In some embodiments, the display controller 150 and the touchscreen controller 140 may be integrated in a single chip.

Similar to the display device 11 in the prior embodiment, the display device 21 may further comprise analog front-end circuits (AFE) and analog-to-digital converters (ADC).

The touchscreen controller 140 can process the data sent by the front-side capacitive sensor 202, while simultaneously detecting touch on the touchscreen 134. Further, this embodiment method based on front-side capacitive sensing may require only one or two additional electrodes to function, which may be advantageous in terms of manufacturing cost and power usage. Advantageously, similar to the prior embodiment, because of the additional electrodes, the display device 21 does not need to perform additional calculation for this embodiment method.

In a capacitive-angular combined method, capacitive sensing may be used to provide an estimate on a number of rotation (n) for the rollable display no when rolling/unrolling. In various embodiments, the capacitive sensing may be based on the back-side capacitive sensor 108 as illustrated in FIGS. 1A-1H, the front-side capacitive sensor 202 as illustrated in FIGS. 2A-2J, or both. Generally, either the back-side capacitive sensor 108 or the front-side capacitive sensor 202 will be used to keep costs lower but in critical applications both may be used either in parallel or to calibrate the other method. In addition, angular sensing using an angular sensor may be used to provide an angle of a hinge θ. In one embodiment, the angle of the hinge θ may have a range of 0°≤θ≤360°. A total rotated angle may be then calculated based on the number of rotations and the angle of the hinge θ. The fractional length 112 may be determined based on the total rotated angle.

In certain embodiments, the processing of data and calculations above may be performed by the host device (e.g., hosting display controller that determines an area of the rollable display no to display the media). The media may then be scaled based on the resolution of the display as determined from the area. The scaled media may then transmitted to the rollable display no to be rendered.

Figure 3A:
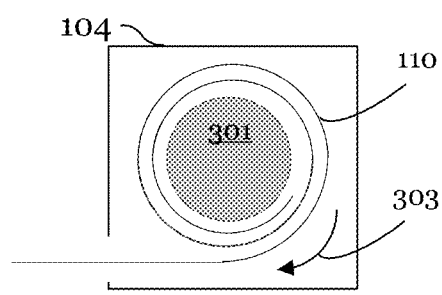
FIG. 3A schematically illustrates a top view of a hinge and a rollable display rolled in around the hinge accordance with an embodiment.

FIG. 3A schematically illustrates a top view of a hinge 301 and the rollable display no rolled in around the hinge 301 contained in the retainment structure 104 in accordance with an embodiment.

The rollable display no shrinks when the rollable display no is rolled on the hinge 301 and extends when the rollable display no is unrolled from the hinge 301. In various embodiments, counting the number of rotations n of the hinge 301 relative to the rollable display no provides an independent measurement of the length of the rollable display no that has been rolled/unrolled.

In various embodiments, a capacitive sensing may be used to determine the number of revolutions of the rollable display no around the hinge 301 (number of rotations n). This is complemented with an angular sensor configured to measure an angle of the rollable display 110 around the hinge 301, for example, by measuring an angular velocity 303. Details of the angular sensing will be described using FIG. 4 after describing the embodiment method combining angular sensing and capacitive sensing.

In various embodiments, number of rotations n of the hinge 301 may be initialized, for example, at the full rolled position when the rollable display no is fully rolled in the housing 102 (n=0) (e.g., FIGS. 1A and 2A). Using a radius r of the hinge 301, an unrolled length of the rollable display no may be expressed as n×2πr. For example, when n=1, the unrolled length is n×2πr, and when n=2, the unrolled length is 4πr. In various embodiments, the number of rotations n may be an integer multiple. Alternately, the number of rotations n may comprise a decimal fraction. The precision of the value of the number of rotations n may depend on the design and arrangement of the capacitive sensor.

In certain embodiments, a thickness of the rollable display no may further be considered for the analysis by the capacitive-angular combined method. An effective radius r' may be defined as the sum of the radius r of the hinge 301 and the thickness of portions of the rollable display no rolled in the housing 102. The effective radius r' may be larger than radius r of the hinge 301 when the rollable display 10 is not fully unrolled, and approaches to radius r of the hinge 301 as the rollable display no is unrolled.

In one embodiment, the effective radius r' may be approximated by the number of rotations n. For example $r_1$, $r_2$, and $r_3$, may be defined as the sum of the radius r of the hinge 301 and the thickness of portions of the rollable display no rolled in the housing 102 at one, two, and three rotations, respectively. Based on this approximation, the unrolled length at any given amount of extension may be expressed as $\Sigma r_n \theta_n$, where $\theta_n$ represents the angle of rotation within each revolution around the hinge 301 in radians (0≤$\theta_n$≤2π). For example, when n=2.5, $\Sigma r_n \theta_n$ is $r_1 \times 2\pi + r_2 \times 2\pi + r_3 \times \pi$.

The capacitive-angular combined method may advantageously provide better accuracy in determining the fractional length 112 compared with a capacitive sensing method alone. Further, in certain embodiments, the capacitive-angular combined method may reduce the resolution requirement for a capacitive sensor (back-side or front-side) because the capacitive sensor may be required to provide only a rough estimate, for example the number of rotations n with an integer multiple (e.g., n=1, n=2, etc.). Accordingly, the design and/or arrangement of the capacitive sensor (e.g., the number of electrodes, the pattern 124 on the back side 110B of the rollable display no, etc.) may be simplified, which may be beneficial in device size reduction and cost saving.

FIGS. 3B-3H illustrate the back-side capacitive sensor 108 and the back side 110B of the rollable display 110 having a simplified pattern of the conductive material based on the combined method using both angular and capacitive sensing in accordance with various embodiments.

Figure 3B:
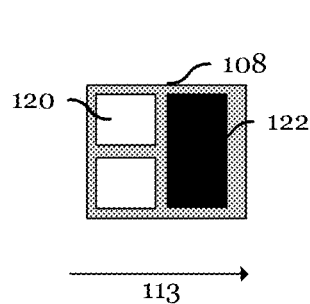
Figure 3C:
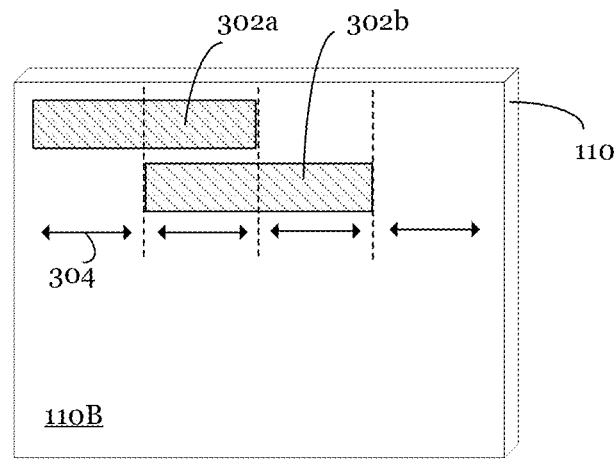

In a first example, the back-side capacitive sensor 108 may comprise two receiver electrodes 120 disposed normal to the rolling direction 113 and a transmitter electrode (FIG. 3B). On the back side 110B of the rollable display no, a pattern of the conductive material may comprise two regions of wide rectangular shapes: a first region 301a and a second region 302b (FIG. 3C). Unlike the prior embodiment, the pattern does not change continuously across the rollable display 110 in the rolling direction 113. In this example embodiment, the total length of the rollable display no may be divided into four sections 304 with equal lengths. Each of the four sections 304 may be detected and identified by the back-side capacitive sensor 108 based on the pattern (e.g., a detection of only the region 302a is indicative of the first section of the four sections 304). In an illustration, each of the four sections 304 may have a length of 2πr so that completion of a full rotation transitions to a different region. In the illustration, it is assumed that the thickness of the rollable display 110 may be ignored and the radius r of the hinge 301 is used. In other embodiments, each of the four sections 304 may have a few multiples (m) of 2π so that completion of a full m rotations transitions to a different region.

Figure 3D:
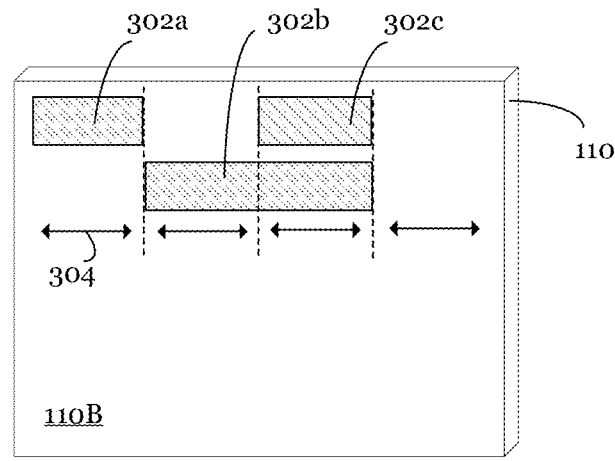
Figure 3E:
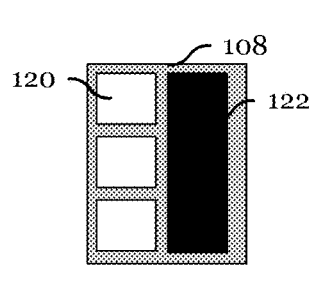
Figure 3F:
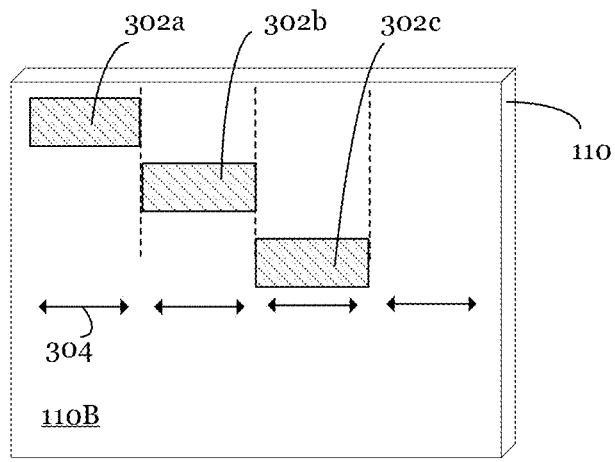
Figure 3G:
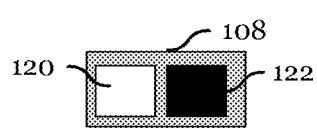
Figure 3H:
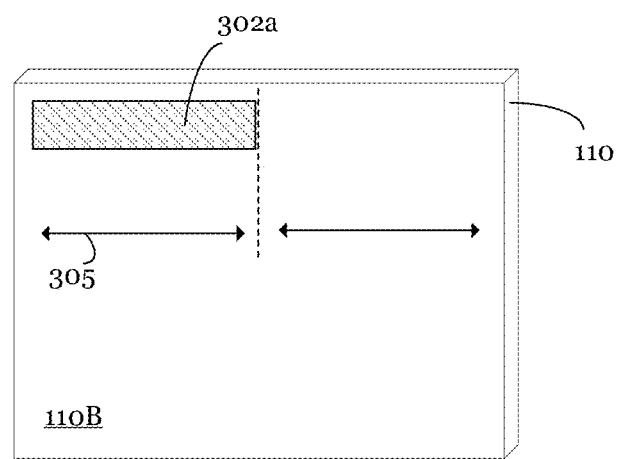

In another example, the pattern on the back side 110B of the rollable display no may comprise three regions: the first region 301a, the second region 302b, and a third region 302c (FIGS. 3D and 3F). Illustrated in FIG. 3D, the third region 302c may be disposed at a same height as the first region 301a in the rollable display 110 and may be detected by the back-side capacitive sensor 108 with the two receiver electrodes 120 in FIG. 3B.

Alternately, the back-side capacitive sensor 108 may comprise three receiver electrodes 120 (FIG. 3E) and each of the three regions (301a, 301b, and 301c) may be disposed at different heights (FIG. 3F).

In other embodiments, the back-side capacitive sensor 108 may further be simplified and comprise a receiver electrode 120 and a transmitter electrode 122. The back side 110B of the rollable display no may comprise the region 302 with a wide rectangular shape, dividing the rollable display no into two sections 305. Each of the two sections 305 may still have a length of 2πr or less. This arrangement may be particularly applicable, for example, when the rollable display no is shorter in the rolling direction 113 than prior embodiments, the radius r of the hinge 301 is larger than prior embodiments, or the method employs the front-side capacitive sensor 202 to supplement the accuracy of detection.

Further, although not specifically illustrated, the pattern of the conductive material on the back side 110B of the rollable display no may divide the rollable display 110 into different regions with different lengths. In one embodiment, the thickness of the rollable display no may be considered. Accordingly, each length of the regions may be selected to account for the change of the effective r' due to the thickness of the rollable display no, so that each region corresponds to each rotation of the rollable display 110.

In this capacitive-angular combined method, the accuracy of detection first obtained by the capacitive sensing is supplemented by angular sensing.

Figure 4A:
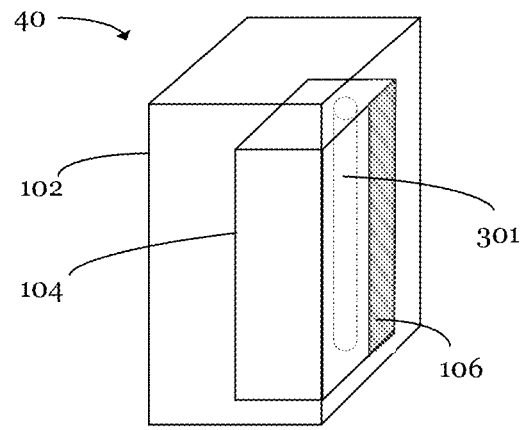
Figure 4B:
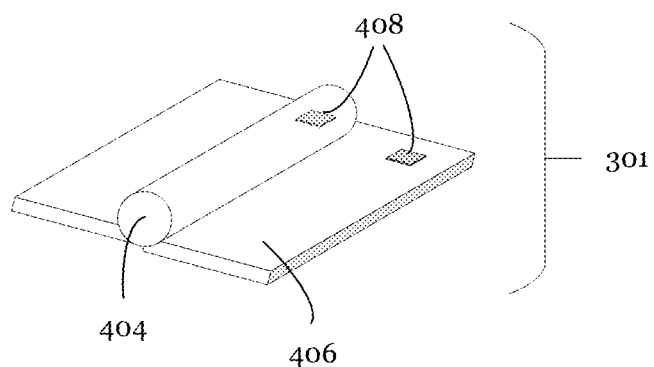
Figure 5:
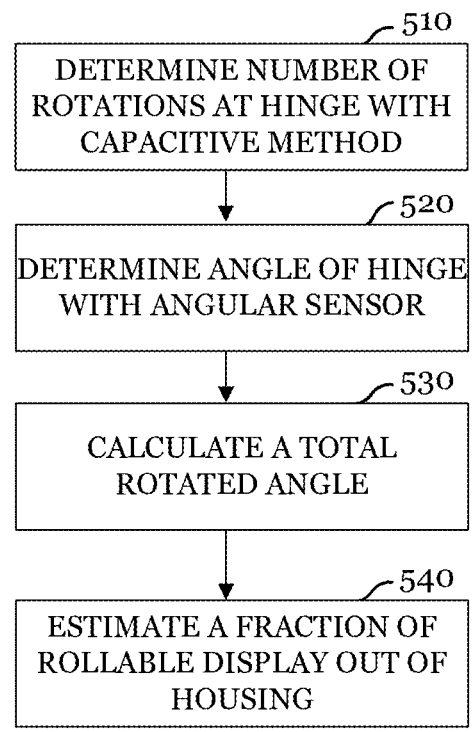
FIG. 5 illustrates a process flow of a method for estimating a fraction of the rollable display unrolled out of the housing.

FIG. 4A schematically illustrates the hinge 301 contained in the display device 40. FIG. 4B schematically illustrate the hinge 301 comprising a pin 404, a hinge plate 406, and an angular sensor 408.

In various embodiments, the angular sensor 408 may comprise a magnetometer configured to detect a change in a magnetic field. The magnetometer may be disposed on various locations of the hinge 301, for example, on the hinge plate 406 or a side of the pin 404. In certain embodiments, the hinge 301 may be made of a magnet, or contain the magnet. Using the magnetometer, an angle of a particular location on the hinge 301 may be determined.

In some embodiments, the angular sensor 408 may comprise two magnetometers. A first magnetometer may be disposed on the hinge plate 406 as a reference, and a second magnetometer may be disposed inside the pin 404 or a side of the pin 404. The angle between the two magnetometer may be determined through measuring the earth's magnetic field.

In alternate embodiments, the angular sensor 408 may comprise two inertial measurement units (IMU). In one or more embodiments, a first IMU may be disposed on the hinge plate 406 as a reference, and a second IMU may be disposed inside the pin 404 or a side of the pin 404. The IMU may comprise a plurality of accelerometers that measures linear acceleration or a plurality of gyroscopes that measures angular velocity. In certain embodiments, the IMU may comprise both accelerometers and gyroscopes. Using accelerometers of the IMU, the angle θ of the hinge 301 may be calculated based on an arctangent of two directions of the gravity from the accelerometers disposed on different locations of the hinge 301. In one embodiment, a first accelerometer may be disposed on the hinge plate 406 and a second accelerometer may be disposed on the side of the pin 404.

Using gyroscopes, accumulated data of angular velocity may be used to calculate the angle θ of the hinge 301. In one embodiment, a first gyroscope may be disposed on the hinge plate 406 and a second gyroscope may be disposed on the side of the pin 404.

Further, in one or more embodiments, both one or more magnetometers and IMUs may be used as the angular sensor 408.

As described above, in certain embodiments, the number of rotations n of the hinge 301 may be estimated based on capacitive sensing. In various embodiments, at each rotation detected by the capacitive sensing, the angular sensor 408 may be initialized to reduce inherent errors that may be accumulated over multiple rotations. In a case when the angular sensor 408 is a gyroscope, the gyroscope may be configured to provide instantaneous angular velocity along multiple orthogonal axes during the process of rolling/unrolling from which an instantaneous angular velocity 303 may be calculated along a direction of the rotation of the hinge 301. While an angle can be determined from this instantaneous angular velocity 303 by an integration, the integration may introduce errors. Therefore, embodiments of the present disclosure envision a correction to the gyroscope measurements.

In various embodiments, the angular sensor 408 may be effectively reset after every rotation or half-rotation using an independent measurement based on capacitive sensing. In various embodiments, this correction could be performed in post-processing the data as long as the signals from the capacitive sensing and angular sensing are synchronized. Since the capacitive sensing is being used as an error correction tool, a pattern 124 on the back side 110B of the rollable display no strategically located that is able to provide periodic measurements is sufficient (rather than a large pattern across the whole rollable display no).

The capacitive-angular combined method takes advantages of both capacitive sensing and angular sensing by supplementing information to each other.

Figure 4C:
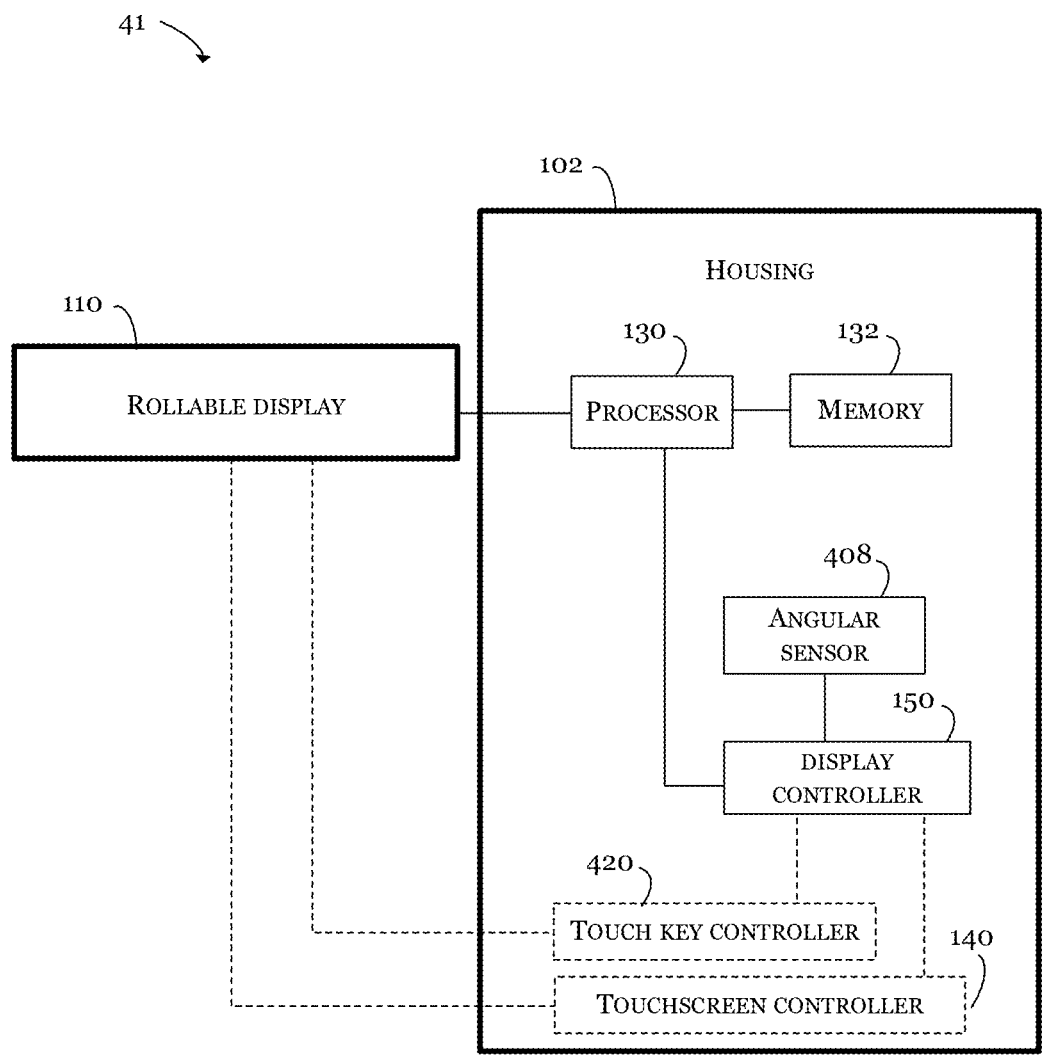
FIG. 4C schematically illustrates a system diagram of the display device for a method combining capacitive sensing and angular sensing.

FIG. 4C schematically illustrates a system diagram of a display device 41 for the capacitive-angular combined method in accordance with one embodiment.

As described above, capacitive sensing may be performed by one of the prior embodiments. Similar to the display device 11 in FIG. 1N, capacitive sensing data may be sent to and processed by the processor 130 (or touchscreen controller 140 or display controller 150) and the memory 132. Alternately, as indicated by dotted lines in FIG. 4C, instead of the processor 130, the touchscreen controller 140 may be used. In yet other embodiments, a touch key controller 420 may be used. The touch key controller 420 may be capable of controlling less number of electrodes compared to a touchscreen controller. However, in this capacitive-angular combined method, the requirement for capacitive sensing is eased by angular sensing. Therefore, in certain embodiments, fewer electrodes, for example only one or two additional electrodes, may be used. This enables the use of the touch key controller 420 as an alternative to the touch screen controller 140, which may be beneficial for cost reduction and power usage reduction.

Similar to prior embodiments, the display device 41 may further comprise analog front-end circuits (AFE) and analog-to-digital converters (ADC).

Still referring to FIG. 4C, in one or more embodiments, the angular sensor 408 may be coupled to the display controller iso, which receives data of capacitive sensing and angular sensing, and computes the unrolled area of the rollable display no to determine an area to display the media. In alternate embodiments, the angular sensor 408 may be coupled to the processor 130, which receives data of capacitive sensing and angular sensing, and computes the unrolled area of the rollable display no to determine an area to display the media.

In various embodiments, the display device 41 may already have an angular sensor, for example intended for other motion detections, and may advantageously be used for this embodiment method. Advantageously, this embodiment may not add any additional hardware costs.

FIG. 5 illustrates a process flow of a capacitive-angular combined method 50 for estimating the fraction of the rollable display no unrolled out of the housing 102 (i.e. the fractional length 112) based on a total rotated angle in accordance with an embodiment.

First, the number of rotation n of the hinge 301 is calculated based on a capacitive method (block 510). The capacitive method may be one of the two prior embodiments (e.g., using the back-side capacitive sensor 108 or using the front-side capacitive sensor 202) or both. Second, the angle θ of the hinge 301 is calculated based on angular sensing (block 520). Third, calculate the total rotated angle $\theta_{total}$ based on a following formula:)(n×360°)+θ(block 530). In one example where n=2 and θ=60°, $\theta_{total}$=780°. Next, based on the total rotate angle $\theta_{total}$, the fraction of rollable display no unrolled out of the housing 102 (i.e., the fractional length 112) may be estimated following a formula: $2\pi r \times \theta_{total}$/(360°×L) with L being the total length of the rollable display no in the rolling direction 113, and r being the radius of the hinge 301 (block 540).

Although not specifically described, any other suitable method of angular detection or an angular sensor already available in various electronic devices may be used.

Example embodiments of the invention are summarized here. Other embodiments can also be understood from the entirety of the specification as well as the claims filed herein. Reference numerals are added below for illustration purposes only and the various examples could be implemented differently and are not to be construed as being limited to only these illustrations.

Example 1. A display device (10, 11, 20, 21, 40, 41) that includes a rollable display (110) including a display side (110A) and an opposite non-display side (110B), the rollable display (110) including a conductive material with a pattern (124) disposed on the non-display side (110B); a housing (102) configured to house the rollable display (110) and configured to roll in and roll out the rollable display (110) along a first direction (113); and a capacitive sensor (108) including a transmitter electrode (122) and a receiver electrode (120) disposed within the housing (102) and configured to sense the pattern (124).

Example 2. The display device (10, 11, 20, 21, 40, 41) of example 1, further including a microprocessor coupled to the capacitive sensor (108) and programmed to: determine an area of the rollable display (110) to display a media in the partially unrolled configuration based on the pattern (124) sensed by the capacitive sensor (108).

Example 3. The display device (10, 11, 20, 21, 40, 41) of one of examples 1 to 2, where the display device (10, 11, 20, 21, 40, 41) is programmed to: determine the resolution of the media to be displayed based on the area of the rollable display (110); scale a media to fit the display size of the partially unrolled configuration; and display the scaled media on the partially unrolled configuration.

Example 4. The display device (10, 11, 20, 21, 40, 41) of one of examples 1 to 3, where the display device (10, 11, 20, 21, 40, 41) is programmed to determine the area of the rollable display (110) by being configured to instruct the capacitive sensor (108) to measure a capacitance between the transmitter electrode (122) and the receiver electrode (120); detect a difference in the capacitance caused by the pattern (124).

Example 5. The display device (10, 11, 20, 21, 40, 41) of one of examples 1 to 4, where the conductive material is coupled to a reference potential node.

Example 6. The display device (10, 11, 20, 21, 40, 41) of one of examples 1 to 5, where the capacitive sensor (108) further includes a plurality of transmitter electrodes (122) disposed in a second direction perpendicular to the first direction (113).

Example 7. The display device (10, 11, 20, 21, 40, 41) of one of examples 1 to 5, where the capacitive sensor (108) further includes a plurality of receiver electrodes (120) disposed in a second direction perpendicular to the first direction (113).

Example 8. The display device (10, 11, 20, 21, 40, 41) of one of examples 1 to 7, further including: an angular sensor (408) configured to determine an angle of a hinge (301) connected to the rollable display (110), where the display device (10, 11, 20, 21, 40, 41) is further programmed to: based on the pattern (124) sensed by the capacitive sensor (108), determine a number of rotations of the hinge (301) that occurred during unrolling of the rollable display (110) from a fully rolled configuration to the partially unrolled configuration; and determine the area of the rollable display (110) based on information on the number of rotations of the hinge (301) and the angle of the hinge (301).

Example 9. The display device (10, 11, 20, 21, 40, 41) of example 8, where the angular sensor (408) includes a magnetometer, an accelerometer, or a gyroscope.

Example 10. A display device (10, 11, 20, 21, 40, 41) that includes a rollable display (110) including a display side (110A) and an opposite non-display side (110B); a housing (102) configured to house the rollable display (110) and configured to roll in and roll out the rollable display (110) along a direction (113); a touchscreen (134) on a display side (110A) of the rollable display (110), the touchscreen (134) including a capacitive sensor (202) and a touchscreen controller (140), the capacitive sensor including a plurality of lines of transmitter electrodes (122) and a plurality of lines of receiver electrodes (120), the plurality of lines of transmitter electrodes (122) being disposed perpendicular to the plurality of lines of receiver electrodes (120); and an additional electrode disposed within the housing (102), coupled to the touchscreen controller (140), and configured to interact with the capacitive sensor (202), where the touchscreen controller (140) has a first program including instructions to: determine a location of the rollable display (110) relative to the additional electrode by identifying which one of the plurality of lines of transmitter electrodes (122) or the plurality of lines of receiver electrodes (120) is nearest to the additional electrode, the location being indicative of a fractional amount of the rollable display (110) outside the housing (102).

Example 11. The display device (10, 11, 20, 21, 40, 41) of example 10, where the additional electrode is a transmitter electrode (122), and where the plurality of lines of receiver electrodes (120) is disposed in the direction (113).

Example 12. The display device (10, 11, 20, 21, 40, 41) of example 10, where the additional electrode is a receiver electrode (120), and where the plurality of lines of transmitter electrodes (122) is disposed in the direction (113).

Example 13. The display device (10, 11, 20, 21, 40, 41) of one of examples 10 to 12, further including a grounding electrode within the housing (102) along with the first additional electrode.

Example 14. The display device (10, 11, 20, 21, 40, 41) of one of examples 10 to 13, further including: a hosting display controller (150) coupled to the touchscreen controller (140) and configured to receive the location of the first additional electrode from the touchscreen controller (140); and determine an area of the rollable display (110) to display a media based on the location of the first additional electrode.

Example 15. The display device (10, 11, 20, 21, 40, 41) of one of examples 10 to 14, further including: an angular sensor (408) configured to determine an angle of a hinge (301) connected to the rollable display (110), where the display device (10, 11, 20, 21, 40, 41) is further programmed to: based on the location of the additional electrode, determine a number of rotations of the hinge (301) that occurred during unrolling of the rollable display (110) from a fully rolled configuration to the partially unrolled configuration; and determine an area of the rollable display (110) based on information on the number of rotations of the hinge (301) and the angle of the hinge (301).

Example 16. The display device (10, 11, 20, 21, 40, 41) of example 15, where the angular sensor (408) includes a magnetometer, an accelerometer, or a gyroscope.

Example 17. A method of displaying a media in a partially unrolled configuration of a rollable display (110), the method including: in response to sensing a motion of a rollable display (110) from a first partially unrolled configuration to a second partially unrolled configuration, determining a number of rotations that occurred at a hinge (301) of a housing (102) for the rollable display (110) using a capacitive sensor located at an opening (106) of the housing (102) during the motion of the rollable display (110); determining, using an angular sensor (408), a change in angle of a location of the hinge (301) using the motion of the rollable display (110); and based on the number of rotations and the change in angle of the hinge (301), determine a fraction of the rollable display (110) that is rolled out of the housing (102).

Example 18. The method of example 17, where determining the number of rotations includes capacitively sensing a pattern (124) of a conductive material disposed over a non-display side (110B) of the rollable display (110).

Example 19. The method of one of examples 17 or 18, where determining the number of rotations includes capacitively sensing a touch-screen electrode on a display side (110A) of the rollable display (110) that is nearest to the capacitive sensor.

Example 20. The method of one of examples 17 to 19, where determining the change in angle includes using a magnetometer, an accelerometer, or a gyroscope.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A display device comprising:
    a rollable display comprising a display side and an opposite non-display side, the rollable display comprising a conductive material with a pattern disposed on the non-display side;
    a housing configured to house the rollable display and configured to roll in and roll out the rollable display along a first direction; and
    a capacitive sensor comprising a transmitter electrode and a receiver electrode, the transmitter electrode and the receiver electrode being disposed within the housing at fixed positions facing the non-display side, and the capacitive sensor being configured to sense the pattern.

2. The display device of claim 1, further comprising a microprocessor coupled to the capacitive sensor and programmed to:
    determine an area of the rollable display to display a media in a partially unrolled configuration based on the pattern sensed by the capacitive sensor.

3. The display device of claim 2, wherein the display device is programmed to:
    determine a resolution of the media to be displayed based on the area of the rollable display to display the media in the partially unrolled configuration;
    scale the media to fit a display size of the partially unrolled configuration; and
    display the scaled media on the area of the rollable display.

4. The display device of claim 1, wherein the pattern has a shape that changes along the first direction, and wherein the display device is programmed to determine the area of the rollable display by being configured to
    instruct the capacitive sensor to measure a capacitance between the transmitter electrode and the receiver electrode; and
    detect a difference in the capacitance caused by a change of the shape of the pattern.

5. The display device of claim 1, wherein the conductive material is coupled to a reference potential node.

6. The display device of claim 1, wherein the capacitive sensor further comprises a plurality of transmitter electrodes disposed in a second direction perpendicular to the first direction.

7. The display device of claim 1, wherein the capacitive sensor further comprises a plurality of receiver electrodes disposed in a second direction perpendicular to the first direction.

8. The display device of claim 1, further comprising:
    an angular sensor configured to determine an angle of a hinge connected to the rollable display, wherein the display device is further programmed to:
    based on the pattern sensed by the capacitive sensor, determine a number of rotations of the hinge that occurred during unrolling of the rollable display from a fully rolled configuration to the partially unrolled configuration; and
    determine the area of the rollable display based on information on the number of rotations of the hinge and the angle of the hinge.

9. The display device of claim 8, wherein the angular sensor comprises a magnetometer, an accelerometer, or a gyroscope.

10. A display device comprising:
a rollable display comprising a display side and an opposite non-display side;
a housing configured to house the rollable display and configured to roll in and roll out the rollable display along a direction;
a touchscreen on a display side of the rollable display, the touchscreen comprising a capacitive sensor and a touchscreen controller, the capacitive sensor comprising a plurality of lines of transmitter electrodes and a plurality of lines of receiver electrodes, the plurality of lines of transmitter electrodes being disposed perpendicular to the plurality of lines of receiver electrodes; and
an additional electrode disposed within the housing, coupled to the touchscreen controller, and configured to interact with the capacitive sensor,
an angular sensor configured to determine an angle of a hinge connected to the rollable display, wherein the touchscreen controller has a first program comprising instructions to:
determine a location of the rollable display relative to the additional electrode by identifying which one of the plurality of lines of transmitter electrodes or the plurality of lines of receiver electrodes is nearest to the additional electrode, the location being indicative of a fractional amount of the rollable display outside the housing.

11. The display device of claim 10, wherein the additional electrode is a transmitter electrode, and wherein the plurality of lines of receiver electrodes is disposed in the direction.

12. The display device of claim 10, wherein the additional electrode is a receiver electrode, and wherein the plurality of lines of transmitter electrodes is disposed in the direction.

13. The display device of claim 10, further comprising a grounding electrode within the housing along with the additional electrode.

14. The display device of claim 10, further comprising:
a hosting display controller coupled to the touchscreen controller and configured to receive the location of the additional electrode from the touchscreen controller; and
determine an area of the rollable display to display a media based on the location of the additional electrode.

15. The display device of claim 10,
wherein the display device is further programmed to:
based on the location of the additional electrode, determine a number of rotations of the hinge that occurred during unrolling of the rollable display from a fully rolled configuration to the partially unrolled configuration; and
determine an area of the rollable display based on information on the number of rotations of the hinge and the angle of the hinge.

16. The display device of claim 10, wherein the angular sensor comprises a magnetometer, an accelerometer, or a gyroscope.

17. A method of displaying a media in a partially unrolled configuration of a rollable display, the method comprising:
in response to sensing a motion of a rollable display from a first partially unrolled configuration to a second partially unrolled configuration,
determining a number of rotations that occurred at a hinge of a housing for the rollable display using a capacitive sensor located at an opening of the housing during the motion of the rollable display;
determining, using an angular sensor, a change in angle of a location of the hinge using the motion of the rollable display; and
based on the number of rotations and the change in angle of the hinge, determine a fraction of the rollable display that is rolled out of the housing.

18. The method of claim 17, wherein determining the number of rotations comprises capacitively sensing a pattern of a conductive material disposed over a non-display side of the rollable display.

19. The method of claim 17, wherein determining the number of rotations comprises capacitively sensing a touchscreen electrode on a display side of the rollable display that is nearest to the capacitive sensor.

20. The method of claim 17, wherein determining the change in angle comprises using a magnetometer, an accelerometer, or a gyroscope.

* * * * *